E. MARSHALL.
GUANO SOWER AND MANURE SPREADER.
No. 11,557. Patented Aug. 22, 1854.
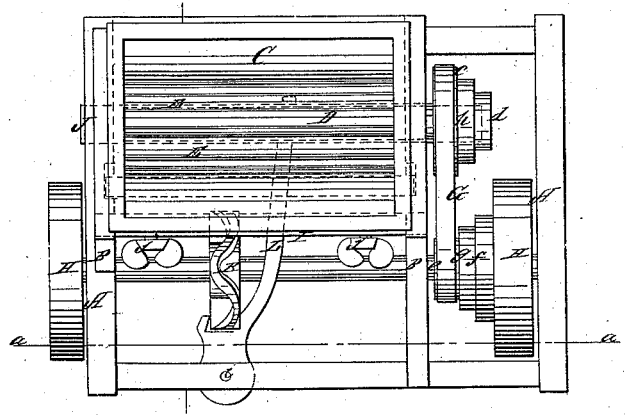
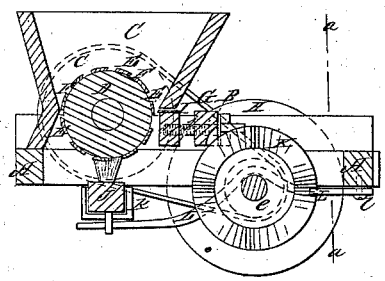
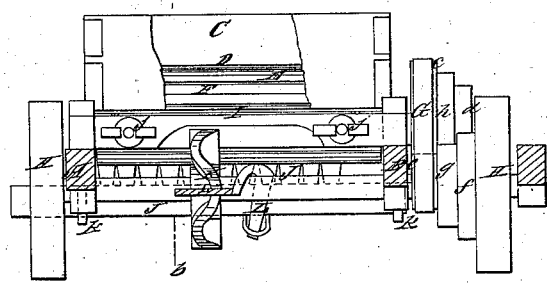

UNITED STATES PATENT OFFICE.

ELBRIDGE MARSHALL, OF CLINTON, NEW JERSEY.

IMPROVEMENT IN MANURE-SPREADERS.

Specification forming part of Letters Patent No. 11,557, dated August 22, 1854.

*To all whom it may concern:*

Be it known that I, ELBRIDGE MARSHALL, of Clinton, in the county of Hunterdon and State of New Jersey, have invented a new and useful Improvement in Guano-Sowers and Manure-Spreaders; and I do hereby declare that the following is a full, clear, and exact description of the same, reference being had to the accompanying drawings, forming part of this specification, in which—

Figure 1 is a plan or top view of a guano-sowing machine with my improvements. Fig. 2 is a vertical section of the same through the line $a\,a$ in Figs. 1 and 2, and Fig. 3 is a vertical transverse section of the same through the line $b\,b$.

Similar letters of reference in each of the several figures indicate corresponding parts.

This invention relates to a new and useful improvement in machines for sowing guano and spreading manure, whereby all possibility of the machine becoming clogged is avoided and a regular and perfect distribution of the substance being sown effected.

The nature of my invention consists in the employment of a horizontal vibrating brush which is arranged directly under the feed-cylinder of a guano-spreader and caused to act upon the same and brush out the guano which may collect in the grooves of said feed-cylinder. By thus employing a vibrating brush the feed-cylinder can always be kept free from clogging and the guano will be spread evenly and perfectly over the whole of the soil.

To enable others skilled in the art to make and use my invention, I will proceed to describe its construction and operation.

A B represent the frame of the machine, made of wood, and of the form shown in the drawings or otherwise.

C represents the hopper.

D is the feed-cylinder. E are blades arranged round the periphery of the same, as shown. F are the grooves formed between said blades. This cylinder is caused to revolve by means of a band, G, leading from a pulley, $c$, on its shaft to a pulley on the shaft of the propelling-wheels H H, as shown in Figs. 1 and 2. The speed of this cylinder can be changed, as desired, by shifting the belt from the pulleys $c\,d$ to those $e\,f$ or $g\,h$.

I is a blade, which acts in concert with the blades on the cylinder, and serves, with said blades, to pulverize the manure or other substance before it is discharged upon the soil. The blade I is made adjustable by the set-screws $j\,j$, and can be set so as to cut fine or coarse, as desired, as may be evident from the drawings.

J is the vibrating brush for preventing the cylinder clogging. Its arrangement will be clearly seen by looking at the drawings. It moves back and forth under the cylinder in the guides $k\,k$, attached to the frame, and in its movement strikes the manure adhering to the cylinder or sticking in the grooves between the blades and causes it to separate and fall upon the soil. The machine would be of very little utility were it not for this brush, for in many instances, when the manure is damp, it would adhere to and pass round continuously with the cylinder, and consequently a greater portion of the soil would be left bare or unimproved in passing over it.

K is a cam secured fast on the shaft of the propelling-wheels, and L is a bent lever or arm connecting the said cam to the vibrating brush in the manner shown in Figs. 1, 2, and 3. This lever or arm turns on a fulcrum at $l$, and when operated upon by the cam, and as it is moved from the position shown in Fig. 1 to the position shown in Fig. 2, and vice versa, causes the brush to vibrate or move back and forth, as will be evident from the drawings.

What I claim as my invention, and desire to secure by Letters Patent, is—

The employment of the vibrating brush, substantially as and for the purposes set forth.

ELBRIDGE MARSHALL.

Witnesses:
S. H. WALES,
J. W. HAMILTON.